(12) United States Patent
Hitzeman

(10) Patent No.: US 7,035,645 B2
(45) Date of Patent: Apr. 25, 2006

(54) METHODS FOR MITIGATING IMPACT ON NON-PRIVILEGED USERS OF POTENTIAL RESOURCE LIMITATIONS IN A COMMUNICATION SYSTEM

(75) Inventor: Bonnie P. Hitzeman, Winfield, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 468 days.

(21) Appl. No.: 10/155,046

(22) Filed: May 24, 2002

(65) Prior Publication Data

US 2003/0220115 A1 Nov. 27, 2003

(51) Int. Cl.
*H04Q 7/20* (2006.01)
(52) U.S. Cl. ............... 455/453; 455/450; 455/452; 455/517; 455/451; 455/454; 455/509; 370/347; 370/329; 370/337; 370/341; 370/344
(58) Field of Classification Search ............ 455/452, 455/450, 517, 451, 453, 454, 509; 370/347; 320/329, 332, 361, 334
See application file for complete search history.

(56) References Cited

U.S. PATENT DOCUMENTS

| | | | | |
|---|---|---|---|---|
| 5,794,156 A | * | 8/1998 | Alanara | 455/517 |
| 5,978,368 A | * | 11/1999 | Hjelm et al. | 370/347 |
| 6,009,331 A | * | 12/1999 | Ueda | 455/450 |
| 6,493,561 B1 | * | 12/2002 | Hasegawa | 455/512 |
| 6,678,526 B1 | * | 1/2004 | Sugirtharaj | 455/450 |
| 2002/0065082 A1 | * | 5/2002 | Yegani et al. | 455/452 |
| 2002/0197998 A1 | * | 12/2002 | Schmidt | 455/452 |

\* cited by examiner

*Primary Examiner*—Joseph Feild
*Assistant Examiner*—David Q. Nguyen
(74) *Attorney, Agent, or Firm*—Steven R. Santema

(57) ABSTRACT

Methods are disclosed for mitigating the impact of resource limitations caused by privileged use schemes, such as WPS and/or GETS, on non-privileged users of a communication system. In one embodiment, a resource controller or switch (#), responsive to receiving (202) an information request from a non-privileged user, retrieves (206, 214) information regarding the percentage or quantity of resources that are being used by privileged users. In one embodiment, upon determining (304) that resources are unavailable for a non-privileged user, a bid option (314) and/or queuing option (322) is offered so as to reduce occurrences of calls (or re-attempted calls) being terminated due to lack of resources.

5 Claims, 3 Drawing Sheets

US 7,035,645 B2

METHODS FOR MITIGATING IMPACT ON NON-PRIVILEGED USERS OF POTENTIAL RESOURCE LIMITATIONS IN A COMMUNICATION SYSTEM

FIELD OF THE INVENTION

This invention relates generally to communication systems having resources subject to limited availability or unavailability due to use by privileged or higher-priority users, such as police, fire or emergency personnel and/or government users; and, more particularly, to methods for mitigating the impact of such resource limitations on non-privileged users of the communication system.

BACKGROUND OF THE INVENTION

Modern communication systems are known to include wireless communication units (e.g., cell phones, radio units and the like) distributed among one or more sites. The communication units wirelessly communicate, via radio frequency (RF) resources with each other and with one or more base stations/radios (usually located at fixed base sites). The wireless links may be implemented using any appropriate access technology including, for example, Global System for Mobile Communications (GSM), Code Division Multiple Access (CDMA), Time Division Multiple Access (TDMA) or Frequency Division Multiple Access (FDMA). The base stations are typically connected to other fixed portions of the system (i.e., the infrastructure) by wireline links. The infrastructure includes equipment used in the processing and monitoring of communications and may include links/gateways to external networks such as the public switched telephone network (PSTN) or the Internet. Hence, wireless users may communicate, via a combination of wireless and wireline links, with wireline telephony devices, servers, and the like.

In certain communication systems, due to national security and emergency preparedness concerns, portions of communication resources may be dedicated or partitioned for use by certain privileged users such as police, fire or emergency personnel and/or government users. Generally, the objective of such systems is to provide priority treatment for privileged users during periods of severe network congestion (as may occur responsive to catastrophic events). To that end, a proposed nationwide Wireless Priority Service (WPS) (also known as Priority Access Service (PAS)) will provide priority treatment for privileged users in certain wireless networks. A complementary system, known as Government Emergency Telecommunications Service (GETS), provides priority treatment for privileged users in selected landline networks.

A problem that arises is that privileged use communication systems, while serving a recognized need, adversely impact the availability of communication resources for non-privileged users. Particularly during periods of severe network congestion, resources may be severely limited or unavailable to non-privileged users (hence they may not be able to complete calls) because privileged users are using much of the resources. If so inclined, the non-privileged users may re-attempt call(s) terminated due to lack of resources at a later time, but they generally have no idea of which call attempt(s) are likely to go through, because they do not know the portion of the network resources that are being used by privileged users.

Accordingly, there is a need for method(s) to mitigate the impact of resource limitations caused by privileged use schemes, such as WPS and GETS, on non-privileged users.

SUMMARY OF THE INVENTION

This need is answered and a technical advance is achieved in the art by a feature whereby non-privileged users are notified of the percentage or quantity of resources that are being used by privileged users (and hence unavailable for non-privileged users), such that the non-privileged users may determine whether or when to re-attempt call(s) or perhaps use an alternative means of communication. The present invention further includes features adapted to reduce or eliminate occurrences of calls (or re-attempted calls) from non-privileged users being terminated due to lack of resources. These features include a queuing option, whereby call(s) that aren't immediately completed due to lack of resources are queued and completed at such time that resources become available; and a bid option whereby non-privileged users may bid on limited resources in an attempt to complete their call(s).

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
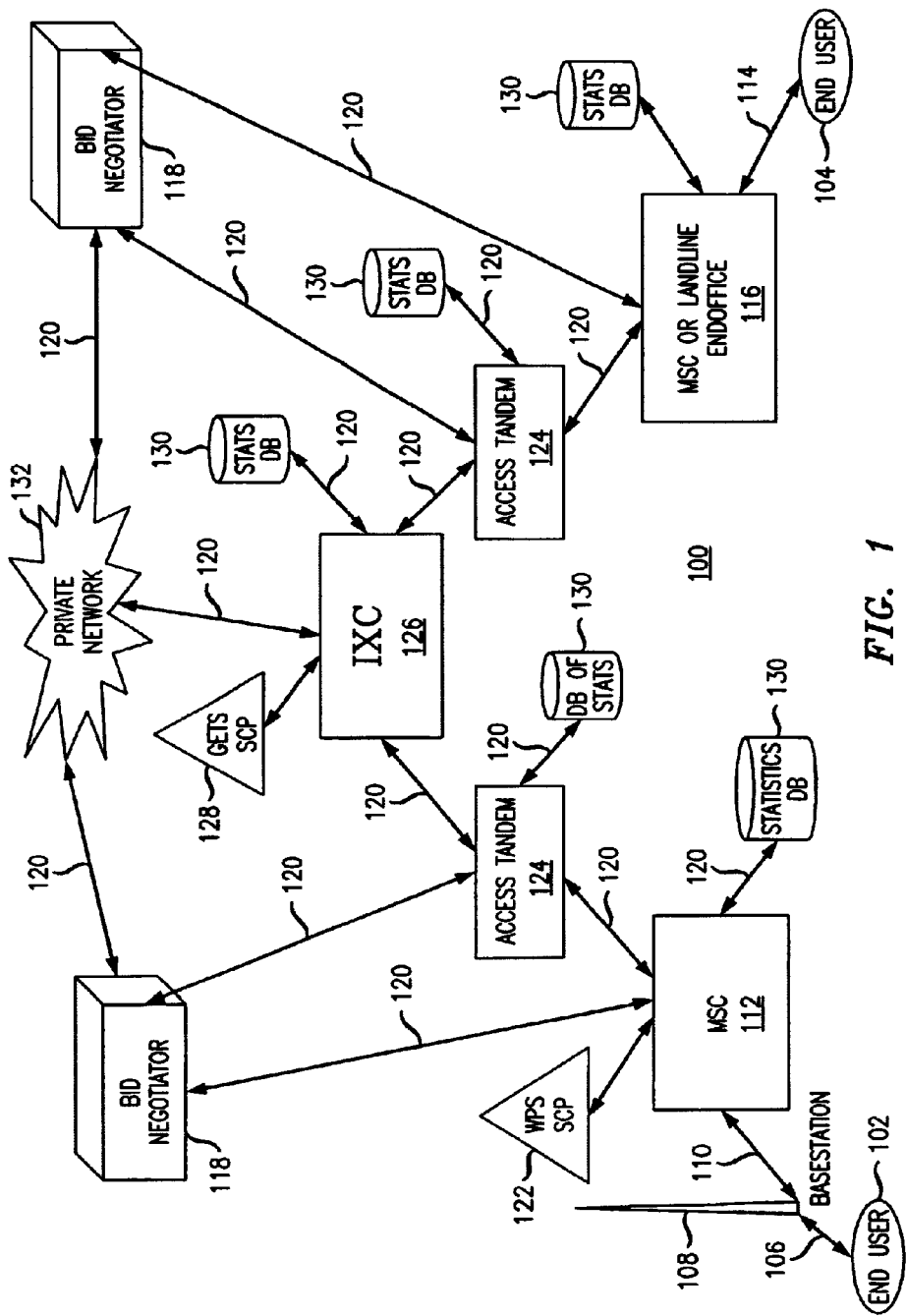
FIG. 1 is a block diagram of a representative communication system having certain resources dedicated for privileged users.

FIG. 1 shows by way of example and not limitation, a communication system 100 comprising a wireless end user 102 and a generic (wireless or wireline) end user 104. The end users 102, 104 may comprise privileged users (e.g., authorized WPS/GETS users) or non-privileged users (e.g., unauthorized WPS/GETS users).

The wireless end user 102, comprising, for example, a cell phone, two-way radio, laptop computer, or personal digital assistant (PDA), communicates via wireless link 106 with a base station 108. The wireless end user 102, generally, is adapted to roam between different RF coverage areas, sometimes referred to as "cells" (not shown) served by different base stations 108. The wireless link 106 between the end user 102 and base station 108 may be physically realized by RF resources such as, for example, narrowband frequency modulated channels, wideband modulated signals, broadband modulated signals, time division modulated slots, code division modulated slots, carrier frequencies, frequency pairs or generally any medium for wirelessly communicating information between the wireless user 102 and base station 108.

The base station 108 is connected via link 110 to a telecommunication switching system, exchange or the equivalent, hereinafter termed a mobile switching center (MSC) 112. The link 110 may comprise, without limitation, conventional subscriber lines, ISDN lines, Ethernet LAN, wireless links, and the like. The MSC 112 may comprise, for example, a 5ESS® switching system, available from Lucent Technologies, Inc. The MSC 112 includes memory and processor(s) (not shown), for storing and executing software routines for processing and switching calls, for providing various call features to calling parties and for providing access to public or private network(s) and/or the public switched telephone network (PSTN). The MSC 112 may be configured for operation with generally any suitable circuit, cell, or packet switching technology.

The end user 104 may comprise a wireline user (such as, for example, a wireline telephone attached to the PSTN) or a wireless user. The end user 104 is connected via link 114 to an MSC or end office (e.g., landline class 5 switch), denoted by reference numeral 116. Generally, an MSC is utilized for wireless users, substantially as described above in relation in MSC 112, whereas an End Office is utilized for wireline users. For GETS, trunk queuing can occur for calls going out of the originating end office. For convenience, the MSC/end office 116 will hereinafter be referred to as an MSC.

In one embodiment, as will be described in greater detail in relation to FIG. 2 and FIG. 3, the MSC(s) 112, 116 are adapted for providing announcement(s) or display(s) to an requester or originator (e.g., user 102 or 104) if congestion occurs within the communication system 100. The MSC(s) 112, 116 are also adapted to administer a queuing option whereby call requests may be queued until such time as resources become available to support the call. Optionally, as shown, the MSC(s) 112, 116 may also have links 120 to bid negotiator(s) 118 to accommodate a bid option whereby users may bid for limited network resources. The links 120 are logical links that may be physically realized, without limitation, by conventional subscriber lines, ISDN lines, WAN links, wireless links, and the like.

MSC(s) 112, 116 are further connected to respective access tandem switches (ATSs) 124. A communication network may include many ATSs. The ATSs may also link to respective bid negotiators 118 to handle users who wish to bid for network resources. Currently for landline GETS, trunk queuing can occur out of the ATS.

The ATSs 124 connect the MSC(s) or end offices to inter-exchange carrier(s) (IXC(s)) 126. In one embodiment of the present invention, the ATSs 124 and/or IXC(s) 126 perform the function of collecting statistics for privileged users.

As shown, MSC 112 is connected to a WPS switching control point (WPS SCP) 122 and the IXC 126 is connected to a GETS switching control point (GETS SCP) 128. The SCPs 122, 128 are the intelligence devices/entities used to authorize the respective WPS/GETS users and, if applicable, to determine their priority. Trunk queuing for landline GETS can also occur at the GETS SCP. As currently proposed, the WPS SCP 122 will be owned by a government entity. The GETS SCP is owned by a carrier (not the government), but receives input from the government on which callers are to be authorized GETS access.

The MSCs 112, 116 are connected to database(s) 130 including statistics of privileged users. The database(s) 130 may be implemented as new components to existing network(s) or may comprise existing components with new functionality. For example, an entity collecting traffic measurements for other purposes may be tasked with additional function of obtaining WPS/GETS statistics.

The IXC 126 is connected to a private network 132. Generally, the private network 132 is a network owned by a private party. As shown, the bid negotiators 118 are also connected to the private network 132. As will be described in greater detail in relation to FIG. 3, the bid negotiators 118 may maintain a queue of bidders for network services. This may include prompting the end user via announcement or display of bid and/or queue information. The negotiator may receive network status via a link from those subscribing to its services such as end offices, tandem offices and possible inter-exchange carriers.

Figure 2:
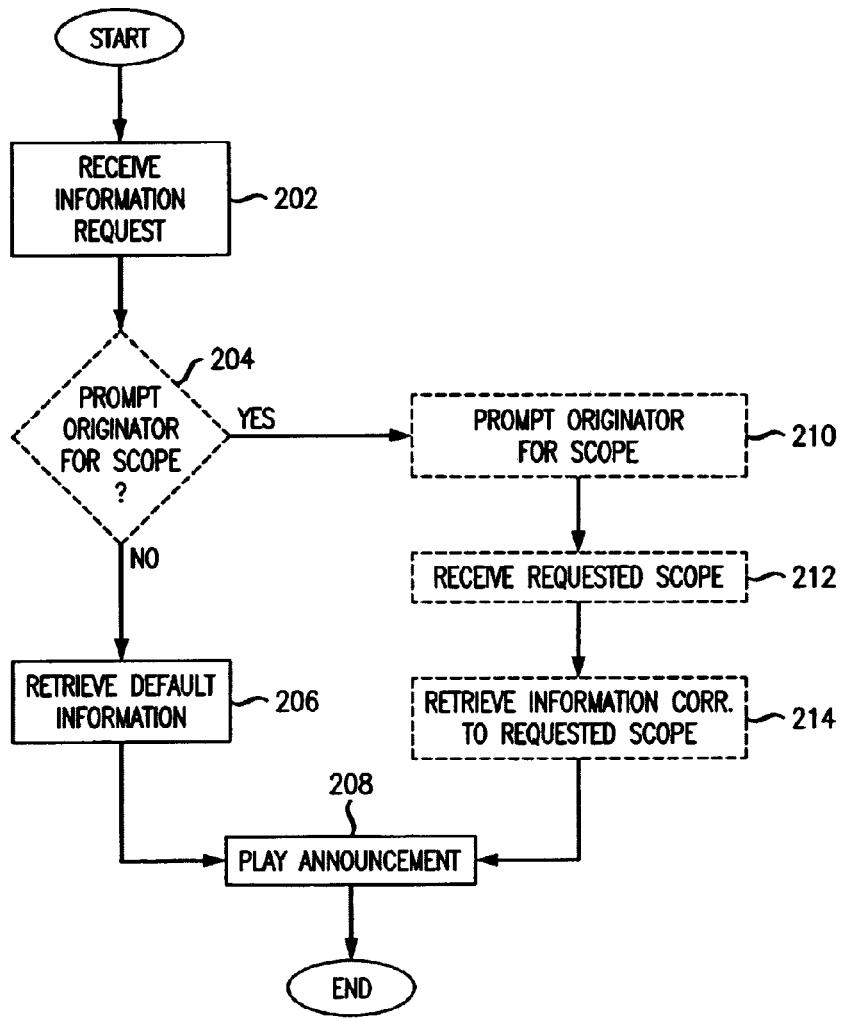
FIG. 2 is a flowchart showing a notification method whereby non-privileged users can receive information regarding communication resource utilization by privileged users.

Referring to FIG. 2, there is shown a notification method according to one embodiment of the present invention. The steps of FIG. 2 are implemented, where applicable, using stored software routines within one or more telecommunication switching systems, exchanges or the equivalent such as, for example, 5ESS®, 5E-DCS® or ECP switching systems, available from Lucent Technologies, Inc.

At step 202, the switching system receives an information request from a requesting unit. The information request may comprise, for example, a request from a non-privileged user for information on privileged WPS/GETS users utilization of wireless and/or wireline resources of a communication system. In one embodiment, the requesting unit comprises a wireless or wireline telephone and the requester initiates the request by going off-hook and dialing a specific feature code (e.g., "*42") or directory number (DN) associated with such information requests. As will be appreciated, other implementations are possible, depending on the features/capabilities of the requesting unit.

Optionally, at step 204, the switching system may determine to prompt the requesting unit for scope (i.e., to enable the user to specify a uniquely "tailored" information request). In one embodiment, if the user is not prompted to give a tailored request, the switching system at step 206 automatically retrieves certain default information regarding resource utilization of the communication system. For example, the default information may indicate the percentage of calls in an originating network that are WPS or GETS calls. Alternatively or additionally, the default information may indicate the percentage of network resources that are available for non-privileged users (e.g., other than WPS or GETS calls). The originating network may comprise, for example, a public or private network serving a geographic area associated with the requester. The information is retrieved from centralized or distributed database(s) in the originating network or foreign network(s).

At step 208, the switching system connects the requesting unit to an announcement or display informing the requesting unit of at least a portion of the default information. For example, an announcement/display may indicate the percentage of WPS calls in the originating network. This number could be determined by traffic measurements implemented by the WPS system. The announcement/display could also indicate the number of WPS calls in queue and any other pertinent traffic information. The information could also be provided on a web page. This could also be extended to the landline toll network to inform the originator of the GETS calls queued in landline network(s). As will be appreciated, the announcement/display may be varied as needed or desired by the service provider to accommodate different type(s) of default information, different privileged use schemes, different languages and so forth, and may be realized in different media (e.g., voice, video or text) depending on the capabilities of the requesting unit.

In response to a positive determination at step 204, the switching system at step 210 prompts the requesting unit for a "tailored" scope and at step 212, receives the requested scope from the requesting unit. It is contemplated, for example, that a user may request resource utilization information relating to network(s) other than the originating network, such as the network associated with a prospective target device. As another example, a user may request resource utilization information along a path leading from his or her originating network to the prospective target device. As will be appreciated, the tailored scope request may comprise virtually any type of requested information, subject to limitations of the requesting unit and/or the information available for retrieval by or from the switching system.

At step 214, the switching system retrieves information corresponding to the requested scope. The process then proceeds to step 208, where the switching system connects the requesting unit to an announcement or display informing the requesting unit of at least a portion of the requested scope information. Again, as with the announcement/display of default information, the announcement/display of scope information may be varied as needed or desired by the service provider to accommodate different type(s) of default information, languages and so forth, and may be realized in different media (e.g., voice, video or text) depending on the capabilities of the requesting unit.

Figure 3:
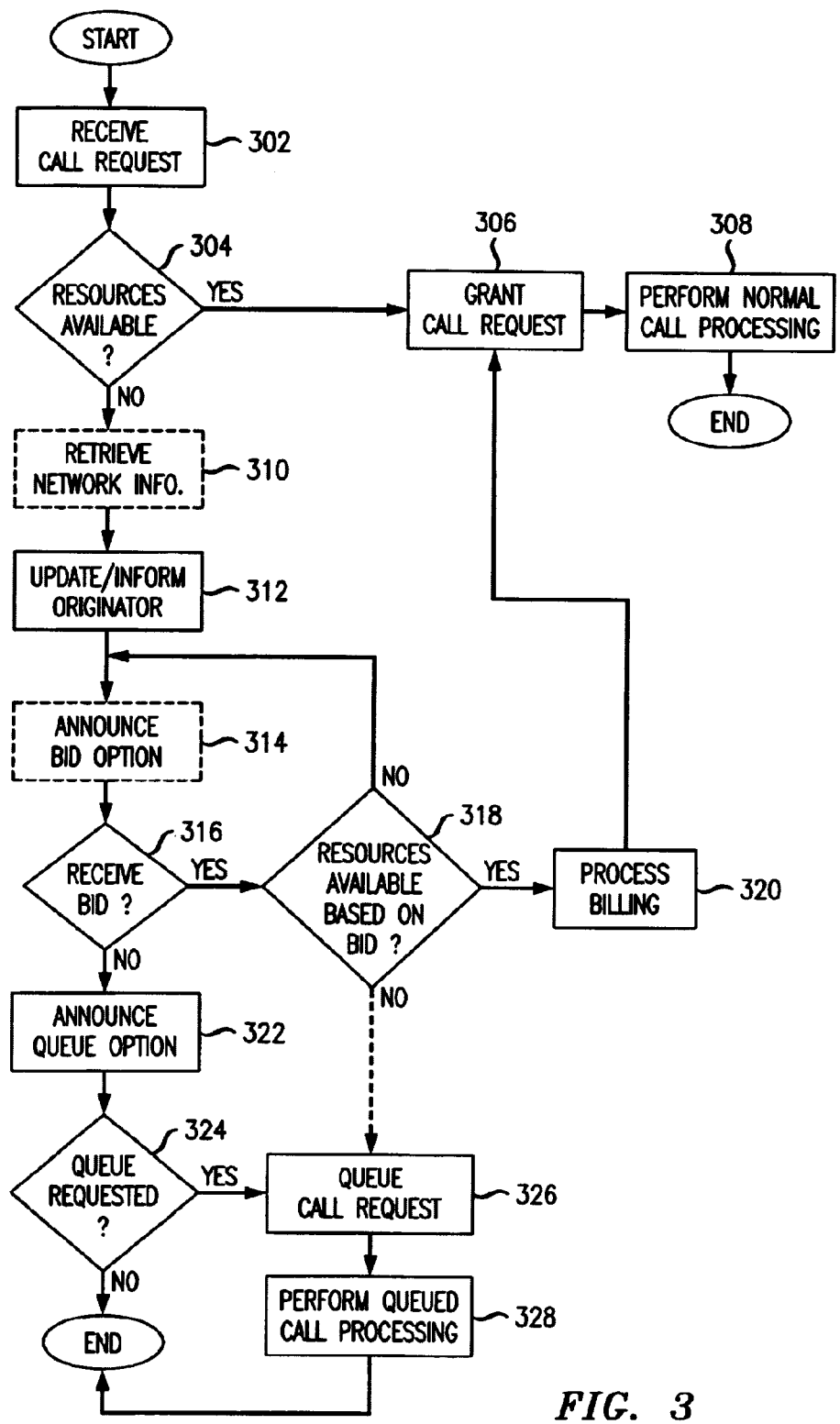
FIG. 3 is a flowchart showing a method for processing calls according to one embodiment of the present invention.

FIG. 3 is a flowchart showing a method for processing calls according to one embodiment of the invention. The steps of FIG. 3 are implemented, where applicable, using stored software routines within one or more telecommunication switching systems, exchanges or the equivalent such as, for example, 5ESS®, 5E-DCS® or ECP switching systems, available from Lucent Technologies, Inc.

At step 302, a call request is received from an originating unit. The originating unit may comprise, for example, a wireless or wireline telephone and the call request is implemented by the user telephone dialing a directory number associated with a target unit. The originating unit (or target unit) may be a privileged user or non-privileged user of a communication system employing WPS, GETS, or other alternative privileged use scheme. At step 304, the switching system (or a communication resource controller operably connected to the switching system) determines whether resources are available to support the call. If resources are available to support the call, the call request is granted at step 306 and the call proceeds according to normal call processing at step 308.

If resources are unavailable to support the call (which may occur due to wireless or wireline resource limitations), the switching system optionally at step 310 retrieves network information regarding resource utilization of the communication system. It is contemplated that resources will be available for most, if not all calls from privileged users and therefore, for purposes of the example, if resources are unavailable the originator is presumed to be a non-privileged user. The network information may comprise default information, retrieved from a centralized or distributed database(s) in the originating network of the non-privileged user, substantially as described in relation to FIG. 2. Thus, for example, the default information may indicate the percentage of calls in the originating network that are WPS or GETS calls. Alternatively or additionally, the user may be prompted for scope of information, substantially as described in relation to FIG. 2.

At step 312, the switching system updates/informs the originator that the call may not be completed (at least not immediately) because of resource limitations. For example, if network information is retrieved at step 310, the switching system connects the requesting unit to an announcement or display informing the non-privileged originator of at least a portion of the network resource information, substantially as described in relation to FIG. 2. Alternatively or additionally, announcement/display(s) not including retrieved network information, busy signals, or the other appropriate means may be used to update/inform the originator that the call may not be immediately completed because of resource limitations.

Optionally, at step 314, the switching system informs the originator that a bid option is available whereby non-privileged users may bid on limited resources in an attempt to complete their call(s). For example, a non-privileged user may wish to bid $100 to complete his or her call or at least to move ahead of other non-privileged users (or perhaps even privileged users) in a queue. The bid option may be provided in the same announcement/display or a different announcement/display as that of step 312. Responsive to the bid announcement/display, the user may request the bid option and indicate his or bid, for example, by pressing certain key(s) on a touch-tone pad.

At step 316, the switching system determines whether a bid is received from the originator. If a bid is received, the switching system determines at step 318 whether resources are available to support the call, based on the sufficiency of the bid. If resources are available to support the call based on the bid, billing is processed at step 320, the call request is granted at step 306 and the call proceeds according to normal call processing at step 308. If resources are not available at step 318 based on the bid, the process proceeds to step 314. Optionally, at step 314, the switching system informs the originator that their initial bid was insufficient to secure resources but that the originator may increase or replace the initial bid in attempt secure resources for the call. If another bid is received, the switching system again determines at step determines at step 318 whether resources are available to support the call, based on the sufficiency of the bid, and so forth.

Alternatively, any time a bid is received at step 316 and resources are determined to be unavailable at step 318, the switching system may queue the call request at step 326. The switching system may advance the call request in the queue, based on the latest bid received from the originator. For example, the call may be placed at the top of the queue (i.e., becoming the next call to be granted upon resources becoming available) in response to a large bid, or advanced just a few positions in response to a modest bid.

If a bid is not received at step 316 (or an insufficient bid was not increased), the switching system informs the originator at step 322 that a queuing option is available whereby calls that are not immediately completed due to lack of resources are queued and completed at such time that resources become available. The queuing option may be announced/displayed at the same or different times as the bid option of step 314 or the announcement of step 312. Responsive to the queuing announcement or display, the user may request the queuing option, for example, by pressing certain key(s) on a touch-tone pad.

At step 324, the switching system determines whether the queuing option is requested from the originator. If the queuing option is requested, the switching system queues the call request at step 326 and the call proceeds according to queued call processing at step 328. That is, the call is placed in a queue along with other queued requests until such time as resources become available to support the call. Queue processing may occur with the originator waiting in the on-hook or off-hook state. Once placed in the queue, the call requests generally advance one by one in the queue (i.e., move closer to the top of the queue) and, when resources become available, call requests at the top of the queue may be granted. However, in the case where the queue includes certain call requests accompanied by bids, it is envisioned that some call requests may be displaced (i.e., moved lower in the queue) if later call requests are accompanied by a higher bid. In the case where the originator is waiting in the queue in the on-hook state, a ping-ring or other suitable signal is sent to the originator to indicate when the originator is coming off queue.

In one embodiment, the queuing option for non-privileged users provides a simple queue, which differs from the type of queue offered for WPS/GETS users in that there are no priority levels, no SCP query. The queuing option provides the ability for non-privileged users to have their call queued instead of just hanging up and trying again and again. The number of calls available for queuing will be limited to a particular queue size, but the queue size could be comparable to WPS and/or GETS queues to ensure a more proportionate access to the network by the public. The queuing option may be offered virtually any time during the call flow when lack of resources is detected, whether it be immediately upon detection that wireless resources are unavailable for a wireless user, or perhaps later in the call setup when it is determined that an outgoing trunk (landline) is not available.

If the queuing option is not requested at step 324 (or if the queue is full), the switching system terminates the call. In such case, the switching system may signal the originator by announcement, tone, display or other means, as known in the art, causing the originator to hang up. If so inclined, the originator may re-attempt the call at a later time or perhaps try to reach the intended target by some other means of communication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system having limited communication resources, wherein at least a portion of the limited communication resources are eligible for use by privileged users, a method comprising:
   receiving an information request from a non-privileged user;
   responsive to receiving the information request:
   inviting the non-privileged user to request a scope of the information request;
   receiving a response including indicia of requested scope; and
   retrieving resource utilization information corresponding to the requested scope, the resource utilization information indicating one or more of: resource utilization by the privileged users; and resource availability for non-privileged users; and
   sending an announcement to the non-privileged user including at least a portion of the resource utilization information.

2. The method of claim 1, wherein the step of retrieving resource utilization information comprises retrieving indicia of wireless resource utilization by the privileged users.

3. The method of claim 1, wherein the step of retrieving resource utilization information comprises retrieving indicia of wireline resource utilization by the privileged users.

4. The method of claim 1, wherein the step of retrieving comprises retrieving indicia of network utilization of privileged users in relation to overall network utilization in the originating network.

5. The method of claim 4, wherein the network utilization of privileged users is based on one or more of GETS and WPS users in relation to overall network utilization in the originating network.

* * * * *